(12) United States Patent
Chen et al.

(10) Patent No.: US 12,468,130 B2
(45) Date of Patent: Nov. 11, 2025

(54) OPTICAL DEVICE AND METHOD OF MANUFACTURING THE SAME

(71) Applicant: TAIWAN SEMICONDUCTOR MANUFACTURING COMPANY LTD., Hsinchu (TW)

(72) Inventors: Wei-Lin Chen, Tainan (TW); Ching-Chung Su, Tainan (TW); Jung-Huei Peng, Hsinchu Hsien (TW); Chun-Wen Cheng, Hsinchu County (TW); Chun-Hao Chou, Tainan (TW); Kuo-Cheng Lee, Tainan (TW)

(73) Assignee: TAIWAN SEMICONDUCTOR MANUFACTURING COMPANY LTD., Hsinchu (TW)

( * ) Notice: Subject to any disclaimer, the term of this patent is extended or adjusted under 35 U.S.C. 154(b) by 485 days.

(21) Appl. No.: 17/815,909

(22) Filed: Jul. 28, 2022

(65) Prior Publication Data

US 2024/0036294 A1 Feb. 1, 2024

(51) Int. Cl.
*G02B 13/00* (2006.01)
*B29D 11/00* (2006.01)
*G01J 1/04* (2006.01)

(52) U.S. Cl.
CPC .... *G02B 13/0075* (2013.01); *B29D 11/00817* (2013.01); *G02B 13/006* (2013.01); *G01J 1/0411* (2013.01)

(58) Field of Classification Search
CPC ............... G02B 13/0075; G02B 13/06; B29D 11/00817; G01J 1/0411
USPC .......................................................... 359/642
See application file for complete search history.

(56) References Cited

U.S. PATENT DOCUMENTS

| | | | |
|---|---|---|---|
| 2019/0187455 A1* | 6/2019 | Iwasaki | G06V 40/19 |
| 2019/0250312 A1* | 8/2019 | Moon | G03B 3/10 |
| 2020/0096678 A1* | 3/2020 | Kaminski | G02B 3/0006 |
| 2020/0110199 A1* | 4/2020 | Kaminski | G02B 3/14 |
| 2020/0363568 A1* | 11/2020 | Moon | H04N 23/67 |
| 2020/0408965 A1* | 12/2020 | Karam | G02B 27/0068 |

FOREIGN PATENT DOCUMENTS

CN 208861990 U * 5/2019

OTHER PUBLICATIONS

CN-208861990-U—English translation—May 2019.*

* cited by examiner

*Primary Examiner* — Sharrief I Broome
(74) *Attorney, Agent, or Firm* — WPAT LAW; Anthony King

(57) ABSTRACT

An optical device includes a substrate, a first electrode, a second electrode, and a first lens. The first electrode and the second electrode are over the substrate and configured to generate a first electric field. The first lens is between the first electrode and the second electrode and has a focal length that varies in response to the first electric field applied to the first lens.

20 Claims, 20 Drawing Sheets

1A

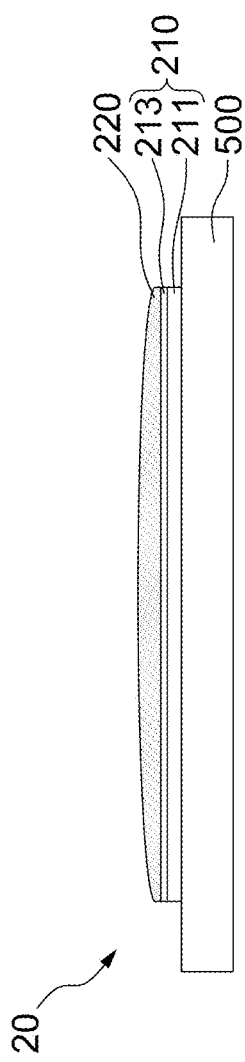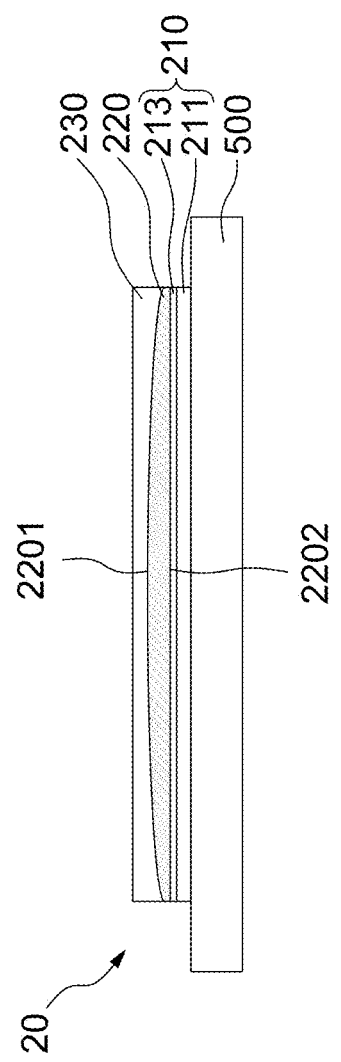

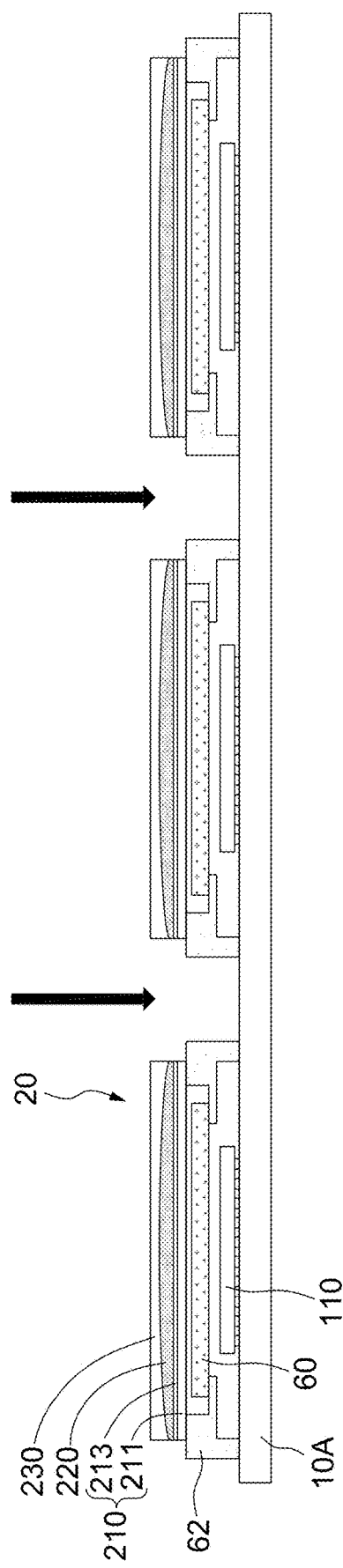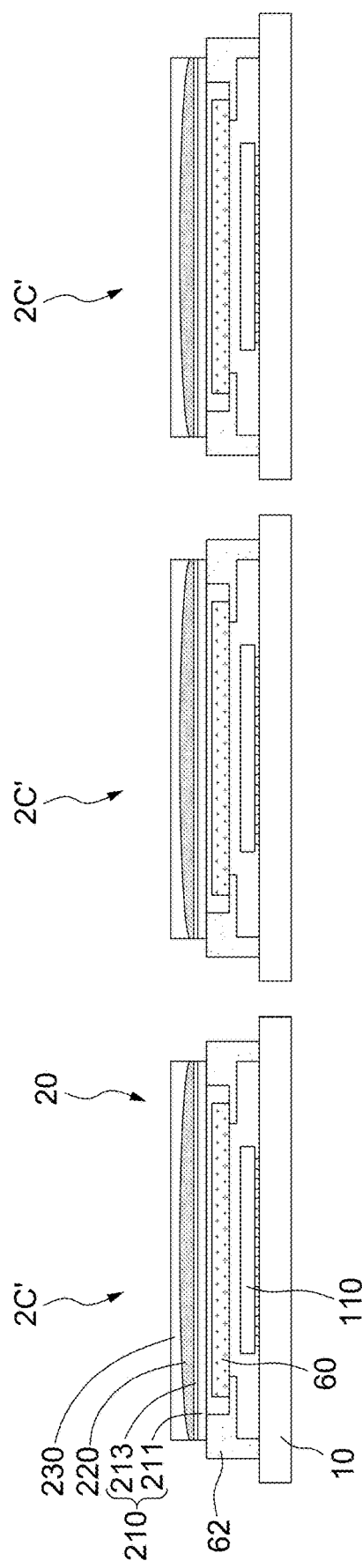

OPTICAL DEVICE AND METHOD OF MANUFACTURING THE SAME

BACKGROUND

Conventional optical devices usually include multiple lens assembled together to realize high optical efficiency. However, assemblies of multiple lens are bulky and costly, and optical functions are not satisfactory.

BRIEF DESCRIPTION OF THE DRAWINGS

Aspects of the present disclosure are best understood from the following detailed description when read with the accompanying figures. It should be noted that, in accordance with the standard practice in the industry, various features are not drawn to scale. In fact, the dimensions of the various features may be arbitrarily increased or reduced for clarity of discussion.

FIGS. 5A to 5F are schematic views of intermediate stages of a method of manufacturing an optical device in accordance with some embodiments of the present disclosure.

DETAILED DESCRIPTION

Figure 1A:
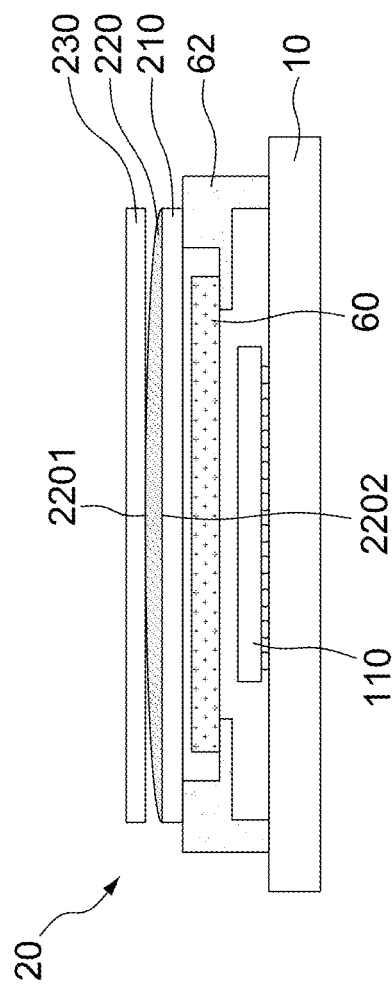
FIG. 1A is a cross-sectional view of an optical device in accordance with some embodiments of the present disclosure.

The following disclosure provides many different embodiments, or examples, for implementing different features of the provided subject matter. Specific examples of elements and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper," "on" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

As used herein, the terms such as "first," "second" and "third" describe various elements, components, regions, layers and/or sections, but these elements, components, regions, layers and/or sections should not be limited by these terms. These terms may be only used to distinguish one element, component, region, layer or section from another. The terms such as "first," "second" and "third" when used herein do not imply a sequence or order unless clearly indicated by the context.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in the respective testing measurements. Also, as used herein, the terms "substantially," "approximately" or "about" generally mean within a value or range that can be contemplated by people having ordinary skill in the art. Alternatively, the terms "substantially," "approximately" or "about" mean within an acceptable standard error of the mean when considered by one of ordinary skill in the art. People having ordinary skill in the art can understand that the acceptable standard error may vary according to different technologies. Other than in the operating/working examples, or unless otherwise expressly specified, all of the numerical ranges, amounts, values and percentages such as those for quantities of materials, durations of times, temperatures, operating conditions, ratios of amounts, and the likes thereof disclosed herein should be understood as modified in all instances by the terms "substantially," "approximately" or "about." Accordingly, unless indicated to the contrary, the numerical parameters set forth in the present disclosure and attached claims are approximations that can vary as desired. At the very least, each numerical parameter should at least be construed in light of the number of reported significant digits and by applying ordinary rounding techniques. Ranges can be expressed herein as from one endpoint to another endpoint or between two endpoints. All ranges disclosed herein are inclusive of the endpoints, unless specified otherwise.

Embodiments of the present disclosure discuss an optical device including one or more lens modules. With the design of the lens in the lens module having a focal length that varies in response to the electric field applied to the lens, multiple lenses and mechanical structures for moving the lenses are not required to achieve focal length adjustments. Therefore, the volume of the lens module is reduced, the assembling and manufacturing is simplified, and the cost is reduced as well.

FIG. 1A is a cross-sectional view of an optical device 1A in accordance with some embodiments of the present disclosure.

Referring to FIG. 1A, the optical device 1A includes a substrate 10, a lens module 20, a filter 60, and a supporting frame 62.

The substrate 10 may be a packaged substrate including one or more sensors. In some embodiments, the substrate 10 includes a sensor 110 connected to an upper surface of the substrate 10. In some embodiments, the substrate 10 may include one or more circuitry layers electrically connected to the sensor 110. The sensor 110 may be electrically connected to the upper surface of the substrate 10 through a plurality of solder bumps. The substrate 10 may further include one or more beam splitters, one or more additional sensors, one or more VCSELs disposed or mounted on the upper surface of the substrate 10 depending on actual applications of the optical device 1A.

The lens module 20 may be disposed or mounted over the substrate 10. In some embodiments, the lens module 20 is disposed over the sensor 110. In some embodiments, the lens module 20 includes electrodes 210 and 230 and a lens (or a lens layer) 220 between the electrode 210 and the electrode 230. In some embodiments, the electrodes 210 and 230 are configured to generate an electric field E1. In some embodiments, the lens 220 has a focal length that varies in response to the electric field E1 applied to the lens 220.

In some embodiments, the electrode 210 may be formed of or include a conductive layer. In some embodiments, the electrode 210 may be formed of or include a transparent conductive material. In some embodiments, the transparent conductive material may include one or more transparent conducting oxides (TCO), such as indium tin oxide (ITO), antimony doped yin oxide (ATO), fluorine doped tin oxide (FTO), aluminum doped zinc oxide (AZO), gallium doped zinc oxide (GZO), indium doped zinc oxide (IZO), or the like.

In some embodiments, the electrode 230 may be formed of or include a conductive layer. In some embodiments, the electrode 230 may be formed of or include a transparent conductive material. In some embodiments, the transparent conductive material may include one or more TCOs, such as ITO, ATO, FTO, AZO, GZO, IZO, or the like.

In some embodiments, the lens 220 may be or include a lens layer. In some embodiments, the lens 220 may be or include one or more electro optical materials. The electro optical material may include potassium tantalate niobate (KTN), barium titanate ($BaTiO_3$), lead zirconium titanate (PZT), lead lanthanum zirconium titanate (PLZT), potassium niobate ($KNbO_3$), lithium niobate ($LiNbO_3$), barium stronitium titanate ($(Ba,Sr)TiO_3$), polycrystalline strontium barium niobate ($Sr_xBa_{1-x}Nb_2O_6$), or the like.

In some embodiments, the lens 220 may be in form of a deposited layer. In some embodiments, the lens 220 has a curved surface 2201 facing the electrode 230. In some embodiments, the lens 220 has a substantially planar surface 2202 on or contacting the electrode 210. In some embodiments, the lens 220 directly contacts the electrodes 210 and 230.

The filter 60 may be between the sensor 110 and the lens module 20. The filter 60 may eliminate radiation having a wavelength range outside of that of the sensor 110. The filter 60 may reduce noise received by the sensor 110.

The supporting frame 62 may be attached to the substrate 10. In some embodiments, the supporting frame 62 defines a cavity for accommodating the filter 60. In some embodiments, the supporting frame 62 defines a cavity for accommodating the sensor 110. In some embodiments, the lens module 20 is attached to a top surface of the supporting frame 62.

According to some embodiments of the present disclosure, with the design of the lens 220 having a focal length that varies in response to the electric field E1 applied to the lens 220, multiple lenses and mechanical structures for moving the lenses are not required to achieve focal length adjustments. Therefore, the volume of the lens module 20 is reduced, the assembling and manufacturing is simplified, and the cost is reduced as well.

The focal length of a conventional lens module including multiple lenses is adjusted by adjusting the distances between the lenses by a mechanical mechanism, the time required for adjustments by a mechanical mechanism is relatively long, and the variation range of the focal length is limited due to the existing physical properties of multiple lenses and the limited volume or space for the adjustment of the distances between the lenses. In contrast, according to some embodiments of the present disclosure, the change in the focal length is performed by varying the voltage applied, and thus the response time is relatively short. In addition, while the change in the foal length is performed by applying different voltages instead of physically moving the lens within a space, thus the variation range (or the working range) of the focal length is not limited to the volume of space the lens module 20 occupied. Therefore, the time for adjustment of the focal length is significantly reduced (i.e., fast response), and the variation range of the focal length is significantly increased.

In addition, according to some embodiments of the present disclosure, since the focal length is adjusted by applying different voltages to generate different electric fields, the resolution of the optical alignment can be significantly increased compared to the errors in shifts of multiple lenses by mechanically moving, and thus the optical performance can be improved.

Moreover, according to some embodiments of the present disclosure, the lens 220 and the electrodes 210 and 230 may be formed by deposition which can be integrated into semiconductor manufacturing processes. For example, the optical device 1A may be formed by a wafer-level process rather than die-to-die assembling processes. Therefore, the manufacturing process is simplified, and the cost is reduced.

Presented below are simulation results of the changes in the focal length of the lens 220 in response to the applied electric field. The lens 220 of embodiment E1 is formed of $BaTiO_3$, and the lens 220 of embodiment E2 is formed of $LiNbO_3$. In table 1, "k" refers to the Pockels' coefficient, "V" refers to the voltage applied, "E" refers to the applied voltage to generate the electric field, "f" refers to the focal length, and "N" refers to the focal length magnification compared to the situation with no electric field applied. The lens 220 has one cured surface with a radius of 30 nm and an opposite surface being substantially flat with an equivalent radius of infinity. The electrodes 210 and 230 are formed of ITO with a refractive index of about 1.8.

TABLE 1

| | E1 | | E2 | |
| --- | --- | --- | --- | --- |
| | k | | | |
| | 0.2 nm/V | | 0.03 nm/V | |
| V (V) | f (μm) | N | f (μm) | N |
| 0 | 4.5 | 1.00 | 6.8 | 1.00 |
| 0.2 | 4.9 | 1.07 | 6.9 | 1.02 |
| 0.4 | 5.2 | 1.15 | 7.0 | 1.03 |
| 0.6 | 5.7 | 1.25 | 7.1 | 1.05 |
| 0.8 | 6.2 | 1.36 | 7.3 | 1.06 |
| 1.0 | 6.8 | 1.50 | 7.4 | 1.08 |
| 1.2 | 7.6 | 1.67 | 7.5 | 1.10 |
| 1.4 | 8.5 | 1.88 | 7.6 | 1.12 |
| 1.6 | 9.7 | 2.14 | 7.7 | 1.14 |
| 1.8 | 11.3 | 2.50 | 7.9 | 1.16 |
| 2.0 | 13.6 | 3.00 | 8.0 | 1.18 |

From Table 1, it is apparent that the focal length of the lens 220 can vary within a relatively large range when applied with a relatively small voltage. Therefore, with the design of the lens module 20 in accordance with some embodiments of the present disclosure, the optical device 1A can provide a relatively large focal length range. In addition, the focal length can be significantly increased with a voltage of only 2 volts applied. Therefore, the power consumption is relatively low.

Figure 1B:
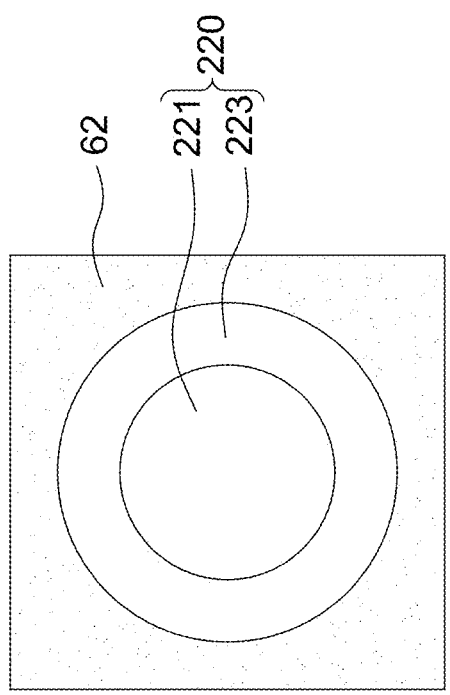
FIG. 1B is a top view of an optical device in accordance with some embodiments of the present disclosure.

FIG. 1B is a top view of an optical device 1B in accordance with some embodiments of the present disclosure. In some embodiments, the optical device 1B is similar to the optical device 1A in FIG. 1A, with differences therebetween as follows. Descriptions of similar components are omitted. In some embodiments, FIG. 1B may show a top view of the structure illustrated in FIG. 1A with some elements omitted for clarity.

In some embodiments, the lens 220 has a portion 221 and a portion 223 distinct from the portion 221. In some embodiments, the portion 221 and the portion 223 are made of or include different electro optical materials. In some embodiments, the portion 221 is a center portion, and the portion 223 is a peripheral portion surrounding the center portion.

Figure 1C:
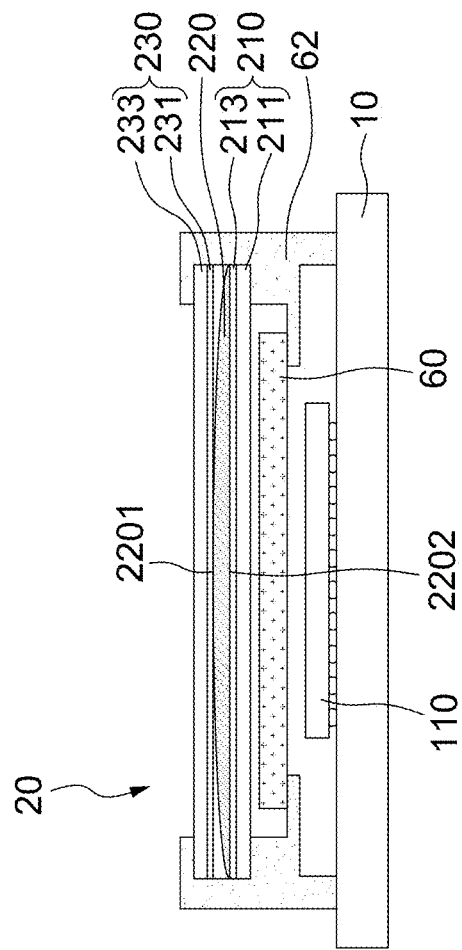
FIG. 1C is a cross-sectional view of an optical device in accordance with some embodiments of the present disclosure.

FIG. 1C is a cross-sectional view of an optical device 1C in accordance with some embodiments of the present disclosure. In some embodiments, the optical device 1C is similar to the optical device 1A in FIG. 1A, with differences therebetween as follows. Descriptions of similar components are omitted.

In some embodiments, the electrode 210 includes a base layer 211 and a conductive layer 213 formed or deposited on the base layer 211. The base layer 211 may be a rigid base layer for providing sufficient structural strength of the electrode 210. The base layer 211 may be a glass layer. In some embodiments, the conductive layer 213 may be a thin metal layer having a thickness of less than about 10 nm and including, for example, gold (Au), silver (Ag), platinum (Pt), copper (Cu), aluminum (Al), chromium (Cr), palladium (Pd), rhodium (Rh), or the like. In some embodiments, the conductive layer 213 may be formed of or include a transparent conductive material. In some embodiments, the transparent conductive material may include one or more TCOs, such as ITO, ATO, FTO, AZO, GZO, IZO, or the like.

In some embodiments, the electrode 230 includes a base layer 233 and a conductive layer 231 formed or deposited on the base layer 233. The base layer 233 may be a rigid base layer for providing sufficient structural strength of the electrode 230. The base layer 233 may be a glass layer. In some embodiments, the conductive layer 231 may be a thin metal layer having a thickness of less than about 10 nm and including, for example, Au, Ag, Pt, Cu, Al, Cr, Pd, Rh, or the like. In some embodiments, the conductive layer 231 may be formed of or include a transparent conductive material. In some embodiments, the transparent conductive material may include one or more TCOs, such as ITO, ATO, FTO, AZO, GZO, IZO, or the like.

In some embodiments, the lens 220 may be deposited on the conductive layer 213 of the electrode 210. The electrode 230 may be stacked on the lens 220.

In some embodiments, the supporting frame 62 includes an extension serving as a lens barrel in which the lens module 20 is installed. In some embodiments, the supporting frame 62 may define a cavity for accommodating the lens module 20. In some embodiments, the electrodes 210 and 230 and the lens 220 are installed in the cavity of the supporting frame 62. In some embodiments, the supporting frame 62 defined a plurality of cavities for accommodating the lens module 20, the filter 60, and the sensor 110, respectively.

Figure 2A:
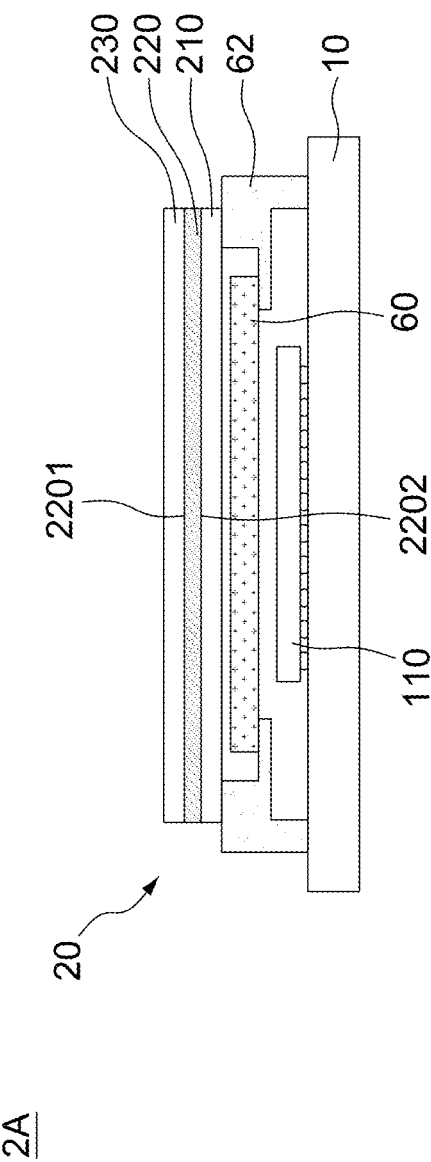
FIG. 2A is a cross-sectional view of an optical device in accordance with some embodiments of the present disclosure.

FIG. 2A is a cross-sectional view of an optical device 2A in accordance with some embodiments of the present disclosure. In some embodiments, the optical device 2A is similar to the optical device 1A in FIG. 1A, with differences therebetween as follows. Descriptions of similar components are omitted.

In some embodiments, the lens 220 of the lens module 20 of the optical device 2A has substantially flat or planar surfaces 2201 and 2202. In some embodiments, the lens 220 directly contacts the electrodes 210 and 230.

Figure 2B:
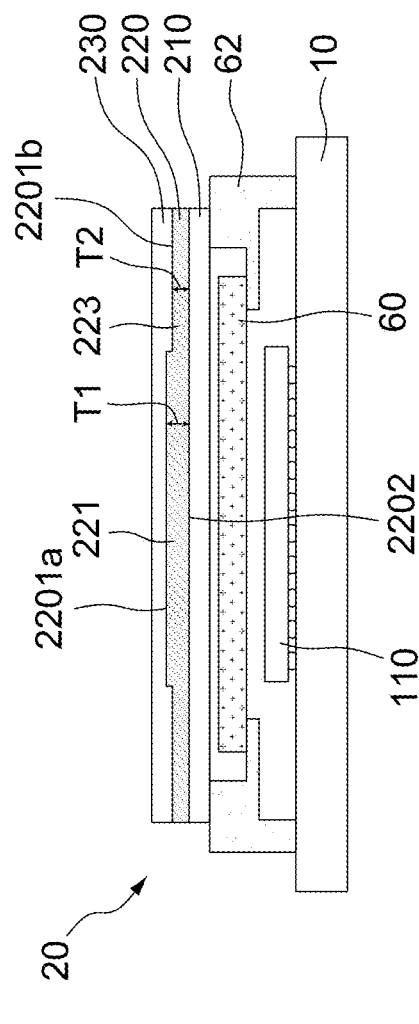
FIG. 2B is a cross-sectional view of an optical device in accordance with some embodiments of the present disclosure.

FIG. 2B is a cross-sectional view of an optical device 2B in accordance with some embodiments of the present disclosure. In some embodiments, the optical device 2B is similar to the optical device 1A in FIG. 1A, with differences therebetween as follows. Descriptions of similar components are omitted. In some embodiments, FIG. 1B may show a top view of the structure illustrated in FIG. 2B with some elements omitted for clarity.

In some embodiments, the portion 221 of the lens 220 has a thickness T1 which is different from a thickness T2 of the portion 223 of the lens 220. In some embodiments, the thickness T2 of the portion 223 (or the peripheral portion) is less than the thickness T1 of the portion 221 (or the center portion). The peripheral portion (i.e., the portion 223) of the lens 20 may surround the center portion (i.e., the portion 221) of the lens 20, and the peripheral portion and the center portion of the lens 20 have different thicknesses (i.e., the thicknesses T1 and T2). In some embodiments, a top surface 2201a of the portion 221 and a top surface 2201b of the portion 223 are at different elevations. In some embodiments, the portions 221 and 223 of the lens 20 directly contact the electrodes 210 and 230.

Figure 2C:
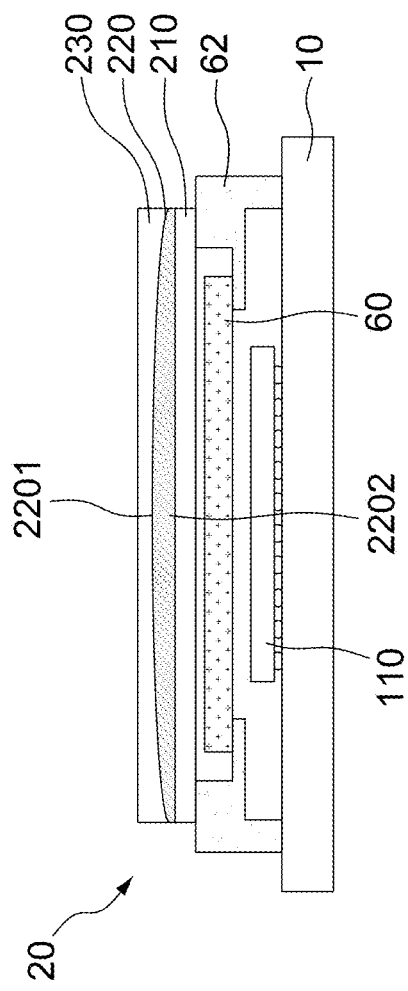
FIG. 2C is a cross-sectional view of an optical device in accordance with some embodiments of the present disclosure.

FIG. 2C is a cross-sectional view of an optical device 2C in accordance with some embodiments of the present disclosure. In some embodiments, the optical device 2C is similar to the optical device 1A in FIG. 1A, with differences therebetween as follows. Descriptions of similar components are omitted.

In some embodiments, the lens 220 has a surface 2201 that is a curved surface and conforms to a surface of the electrode 230. In some embodiments, the surface 2201 of the lens 220 is convex toward the electrode 230. In some embodiments, the lens 220 is deposited on the electrode 210, and the electrode 230 is deposited on the lens 220.

Figure 2D:
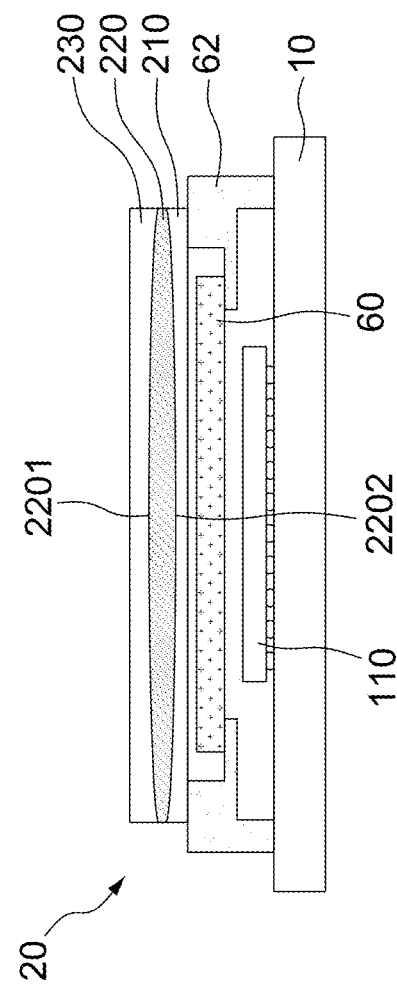
FIG. 2D is a cross-sectional view of an optical device in accordance with some embodiments of the present disclosure.

FIG. 2D is a cross-sectional view of an optical device 2D in accordance with some embodiments of the present disclosure. In some embodiments, the optical device 2D is similar to the optical device 1A in FIG. 1A, with differences therebetween as follows. Descriptions of similar components are omitted.

In some embodiments, the lens 220 has a surface 2201 that is a curved surface and conforms to a surface of the electrode 230. In some embodiments, the lens 220 further has a surface 2202 that is opposite to the surface 2201 and is a curved surface that conforms to a surface of the electrode 210. In some embodiments, the surface 2201 of the lens 220 is convex toward the electrode 230, and surface 2202 of the lens 220 is convex toward the electrode 210. In some embodiments, the electrodes 210 and 230 are deposited on the lens 220.

Figure 3A:
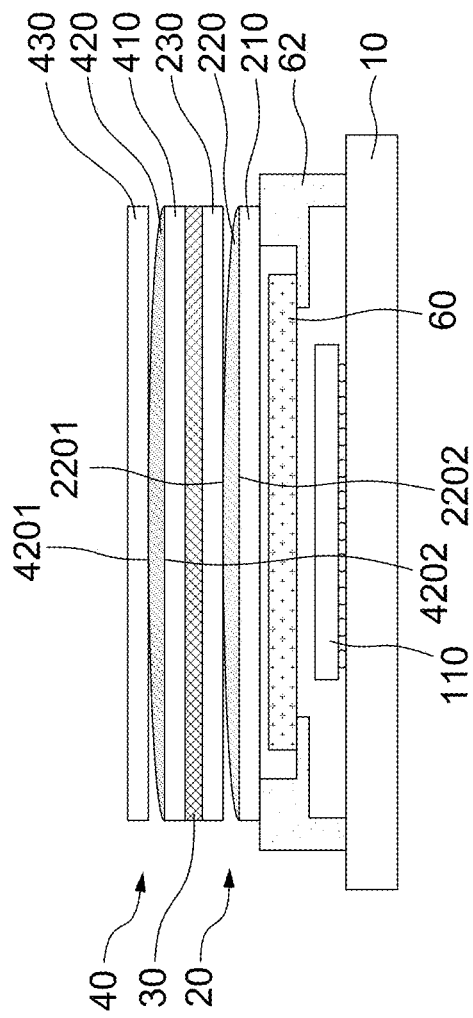
FIG. 3A is a cross-sectional view of an optical device in accordance with some embodiments of the present disclosure.

FIG. 3A is a cross-sectional view of an optical device 3A in accordance with some embodiments of the present disclosure. In some embodiments, the optical device 3A is similar to the optical device 1A in FIG. 1A, with differences therebetween as follows. Descriptions of similar components are omitted.

In some embodiments, the optical device 3A further includes a lens module 40 over the lens module 20. In some embodiments, the optical device 3A further includes an isolation element 30 between the lens module 20 and the lens module 40.

In some embodiments, the lens module 40 includes electrodes 410 and 430 and a lens (or a lens layer) 420 between the electrode 410 and the electrode 430. In some embodiments, the electrodes 410 and 430 are over the electrodes 210 and 230. In some embodiments, the electrodes 410 and 430 are configured to generate an electric field E2. In some embodiments, the lens 420 has a focal length that varies in response to the electric field E2 applied to the lens 420. In some embodiments, the electric field E2 may be different from or the same as the electric field E1. For example, the electric fields E1 and E2 may be different in magnitudes, directions, or both.

In some embodiments, the electrode 410 may be formed of or include a conductive layer. In some embodiments, the electrode 410 may be formed of or include a transparent conductive material. In some embodiments, the transparent conductive material may include one or more TCOs, such as ITO, ATO, FTO, AZO, GZO, IZO, or the like.

In some embodiments, the electrode 430 may be formed of or include a conductive layer. In some embodiments, the electrode 430 may be formed of or include a transparent conductive material. In some embodiments, the transparent conductive material may include one or more TCOs, such as ITO, ATO, FTO, AZO, GZO, IZO, or the like.

In some embodiments, the lens 420 may be or include a lens layer. In some embodiments, the lens 420 may be or include one or more electro optical materials. The electro optical material may include KTN, $BaTiO_3$, PZT, PLZT, $KNbO_3$, $LiNbO_3$, $(Ba,Sr)TiO_3$, $Sr_xBa_{1-x}Nb_2O_6$, or the like. The lens 220 and the lens 420 may be formed of or include the same material or different materials.

In some embodiments, the lens 420 may be in form of a deposited layer. In some embodiments, the lens 420 has a curved surface 4201 facing the electrode 430. In some embodiments, the lens 420 has a substantially planar surface 4202 on or contacting the electrode 410. In some embodiments, the lens 420 directly contacts the electrodes 410 and 430.

In some embodiments, the isolation element 30 isolates the electric field E1 from the electric field E2. In some embodiments, the isolation element 30 electrically isolates the lens module 20 from the lens module 40. In some embodiments, the isolation element 30 includes an insulating material. In some embodiments, the isolation element 30 may be or include a glass layer.

Figure 3B:
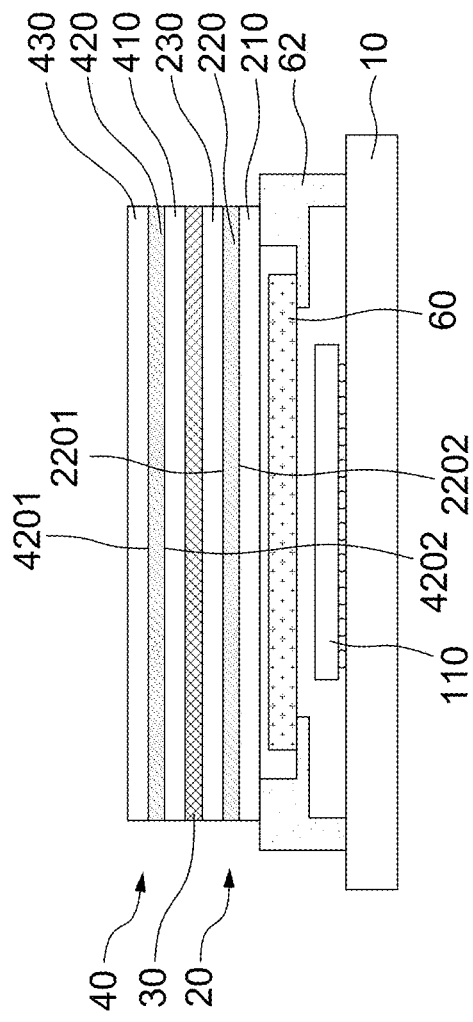
FIG. 3B is a cross-sectional view of an optical device in accordance with some embodiments of the present disclosure.

FIG. 3B is a cross-sectional view of an optical device 3B in accordance with some embodiments of the present disclosure. In some embodiments, the optical device 3B is similar to the optical device 3A in FIG. 3A, with differences therebetween as follows. Descriptions of similar components are omitted.

In some embodiments, the lens 420 of the lens module 20 of the optical device 3B has substantially flat or planar surfaces 4201 and 4202. In some embodiments, the lens 420 directly contacts the electrodes 410 and 430.

Figure 3C:
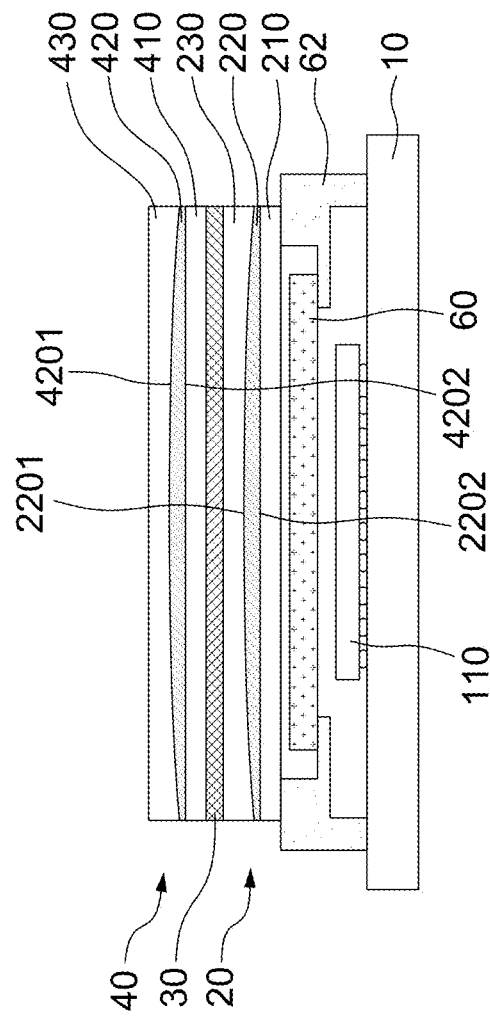
FIG. 3C is a cross-sectional view of an optical device in accordance with some embodiments of the present disclosure.

FIG. 3C is a cross-sectional view of an optical device 3C in accordance with some embodiments of the present disclosure. In some embodiments, the optical device 3C is similar to the optical device 3A in FIG. 3A, with differences therebetween as follows. Descriptions of similar components are omitted.

In some embodiments, the lens 420 has a surface 4201 that is a curved surface and conforms to a surface of the electrode 430. In some embodiments, the surface 4201 of the lens 420 is convex toward the electrode 430. In some embodiments, the electrode 410 is deposited on the isolation element 30. In some embodiments, the lens 420 is deposited on the electrode 410, and the electrode 430 is deposited on the lens 420.

Figure 3D:
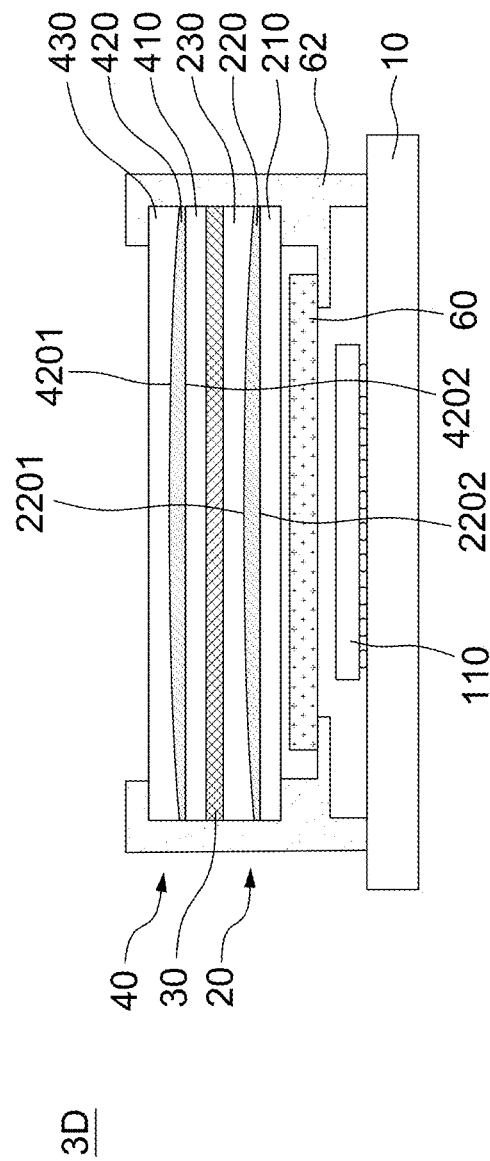
FIG. 3D is a cross-sectional view of an optical device in accordance with some embodiments of the present disclosure.

FIG. 3D is a cross-sectional view of an optical device in accordance with some embodiments of the present disclosure. In some embodiments, the optical device 3D is similar to the optical device 3C in FIG. 3C, with differences therebetween as follows. Descriptions of similar components are omitted.

In some embodiments, the supporting frame 62 includes an extension serving as a lens barrel in which the lens modules 20 and 40 are installed. In some embodiments, the supporting frame 62 may define a cavity for accommodating the lens modules 20 and 40. In some embodiments, the electrodes 210, 230, 410, and 430 and the lenses 220 and 420 are installed in the cavity of the supporting frame 62. In some embodiments, the supporting frame 62 defined a plurality of cavities for accommodating the lens modules 20 and 40, the filter 60, and the sensor 110, respectively.

Figure 4A:
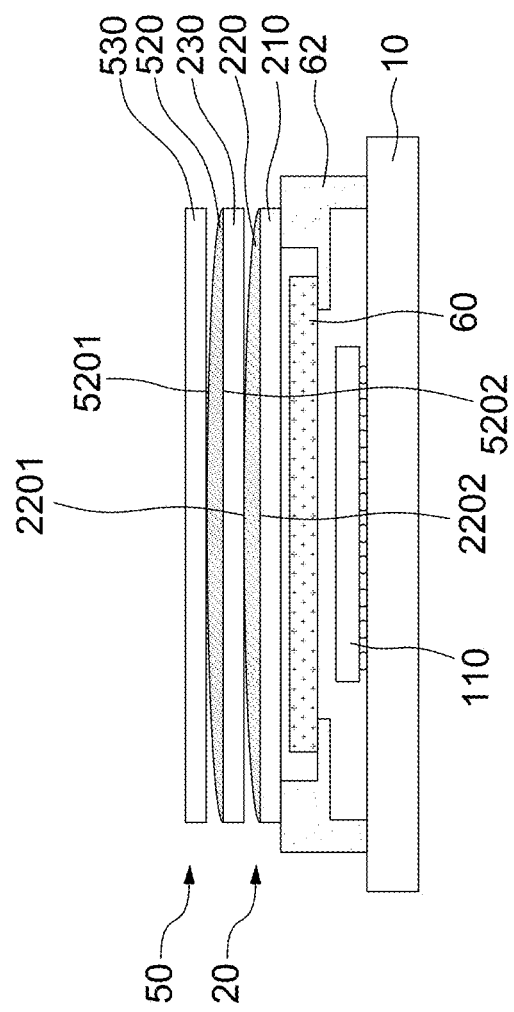
FIG. 4A is a cross-sectional view of an optical device in accordance with some embodiments of the present disclosure.

FIG. 4A is a cross-sectional view of an optical device 4A in accordance with some embodiments of the present disclosure. In some embodiments, the optical device 4A is similar to the optical device 1A in FIG. 1A, with differences therebetween as follows. Descriptions of similar components are omitted.

In some embodiments, the optical device 4A further includes a lens 520 and an electrode 530 over the lens module 20.

In some embodiments, the electrode 530 is electrically coupled to the lens module 20. In some embodiments, the electrodes 230 and 530 and the lens 520 interposed therebetween collectively may be referred to as a lens module 50. In some embodiments, the lens module 50 is electrically coupled to the lens module 20. In some embodiments, the electrode 530 and the electrode 230 may generate an electric field which is electrically coupled to the electric field E1.

In some embodiments, the lens 520 is between the lens module 20 and the electrode 530. In some embodiments, the lens 520 is between the electrode 530 and the electrode 230, and the electrode 230 is between the lens 220 and the lens 520. In some embodiments, the lens 520 may be or include a lens layer. In some embodiments, the lens 520 may be or include one or more electro optical materials. The electro optical material may include KTN, $BaTiO_3$, PZT, PLZT, $KNbO_3$, $LiNbO_3$, $(Ba,Sr)TiO_3$, $Sr_xBa_{1-x}Nb_2O_6$, or the like. The lens 220 and the lens 520 may be formed of or include the same material or different materials. In some embodiments, the lens 520 may be in form of a deposited layer. In some embodiments, the lens 520 has a curved surface 5201 facing the electrode 530. In some embodiments, the lens 520 has a substantially planar surface 5202 on or contacting the electrode 230. In some embodiments, the lens 420 directly contacts the electrodes 230 and 530.

In some embodiments, the electrode 530 is over the electrodes 210 and 230. In some embodiments, the electrode 530 may be formed of or include a conductive layer. In some embodiments, the electrode 530 may be formed of or include a transparent conductive material. In some embodiments, the transparent conductive material may include one or more TCOs, such as ITO, ATO, FTO, AZO, GZO, IZO, or the like.

Figure 4B:
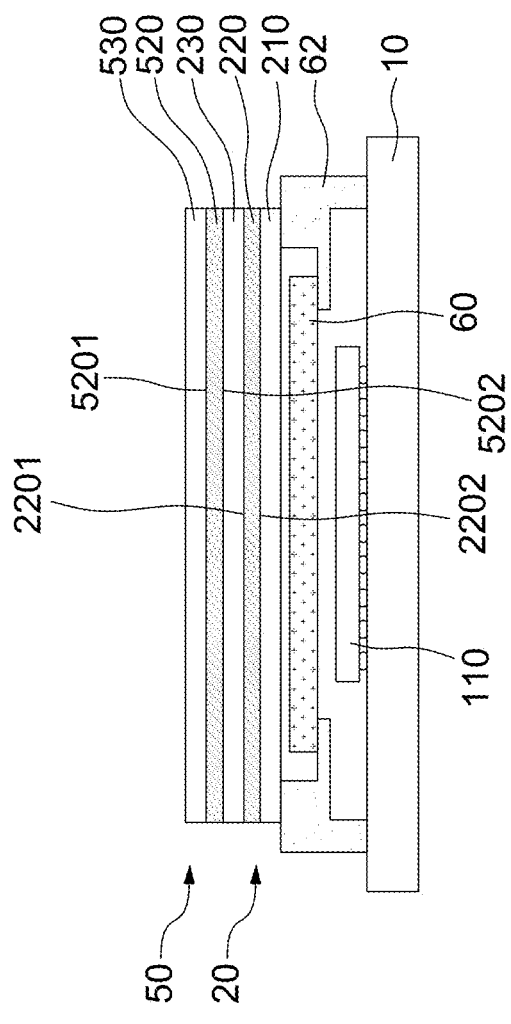
FIG. 4B is a cross-sectional view of an optical device in accordance with some embodiments of the present disclosure.

FIG. 4B is a cross-sectional view of an optical device in accordance with some embodiments of the present disclosure. In some embodiments, the optical device 4B is similar to the optical device 4A in FIG. 4A, with differences therebetween as follows. Descriptions of similar components are omitted.

In some embodiments, the lens 520 of the lens module 20 of the optical device 4B has substantially flat or planar surfaces 5201 and 5202. In some embodiments, the lens 520 directly contacts the electrodes 230 and 430.

Figure 4C:
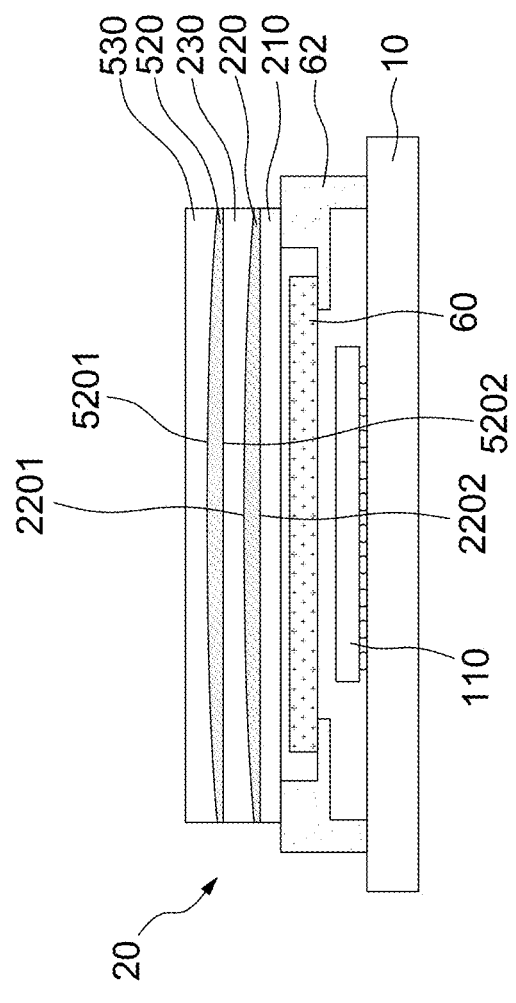
FIG. 4C is a cross-sectional view of an optical device in accordance with some embodiments of the present disclosure.

FIG. 4C is a cross-sectional view of an optical device 4C in accordance with some embodiments of the present disclosure. In some embodiments, the optical device 4C is similar to the optical device 4C in FIG. 4C, with differences therebetween as follows. Descriptions of similar components are omitted.

In some embodiments, the lens 520 has a surface 5201 that is a curved surface and conforms to a surface of the electrode 530. In some embodiments, the surface 5201 of the lens 520 is convex toward the electrode 530. In some embodiments, the lens 420 is deposited on the electrode 230, and the electrode 530 is deposited on the lens 520.

According to some embodiments of the present disclosure, with two or more lens modules assembled together, multiple electric fields can be applied to independently control the two lenses in the lens modules, and thus the working range may be increased. Therefore, the optical performance can be further improved.

FIGS. 5A to 5F are schematic views of intermediate stages of a method of manufacturing an optical device 2C' in accordance with some embodiments of the present disclosure.

Referring to FIG. 5A, a carrier 500 may be provided, a base layer 211 may be disposed on the carrier 500, a conductive layer 213 may be formed on the base layer 211, and an electro optical layer (i.e., the lens 220) may be formed on the conductive layer 213. In some embodiments, the conductive layer 213 and the electro optical layer (or the lens 220) are formed by deposition (e.g., CVD) or coating. The base layer 211 and the conductive layer 213 may collectively form an electrode 210.

In some embodiments, the conductive layer 213 may be deposited on the carrier 500, and the electro optical layer (or the lens 220) may be deposited on the conductive layer 213. In some embodiments, the base layer 211 may be a rigid base layer, and the conductive layer 213 may be deposited on the base layer 211.

Referring to FIG. 5B, a conductive layer (i.e., the electrode 230) may be formed on the electro optical layer (or the lens 220). In some embodiments, the conductive layer (or the electrode 230) is formed by deposition (e.g., CVD) or coating. As such, a lens module 20 including the electrodes 210 and 230 and the lens 220 is formed.

Figure 5C:
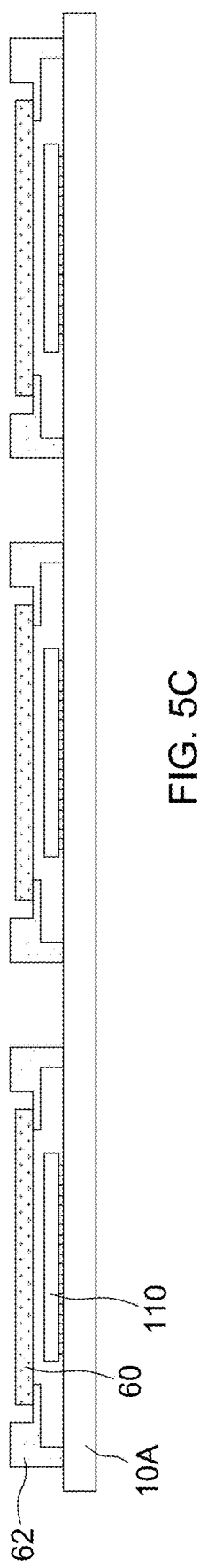

Referring to FIG. 5C, a substrate strip 10A may be provided. In some embodiments, the substrate strip 10A includes a plurality of sensors 110 connected to an upper surface of the substrate strip 10A. In some embodiments, a plurality of supporting frames 62 are attached to the substrate strip 10A, and each of the supporting frames 62 has a cavity in which one of the sensors 110 is accommodated or received. In some embodiments, a plurality of filters 60 are correspondingly disposed within the supporting frames 62.

Figure 5D:
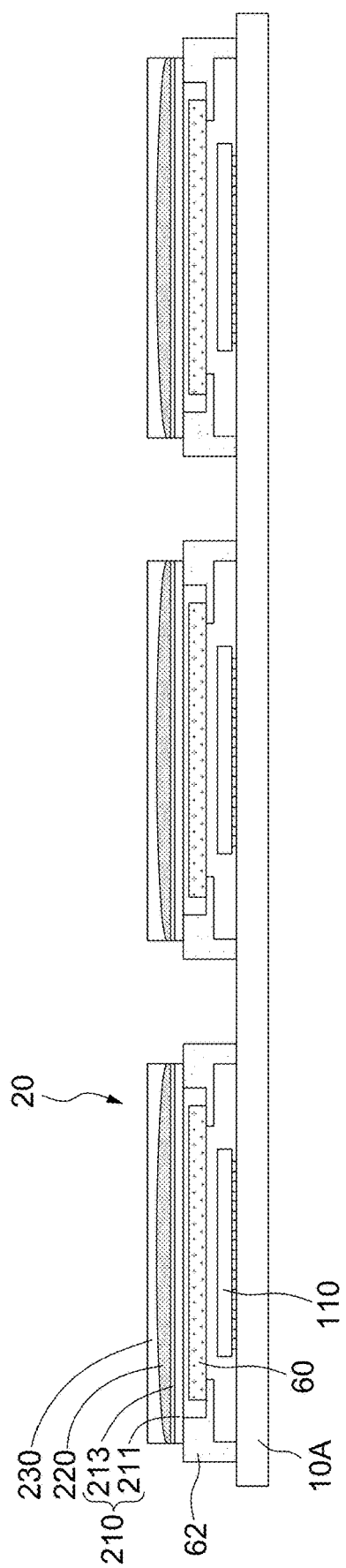

Referring to FIG. 5D, a plurality of the lens modules 20 may be disposed or formed over the substrate strip 10A. In some embodiments, the carrier 500 is removed after the electro optical layer (or the lens 220) is formed on the conductive layer 213 and the conductive layer (or the electrode 230) is formed on the electro optical layer (or the lens 220). In some embodiments, the base layer 211 (or the rigid base layer) with the conductive layer 213, the electro optical layer (or the lens 220), and the conductive layer (or the electrode 230) formed thereon are disposed on or attached to the substrate strip 10A.

Referring to FIG. 5E, a singulation process may be performed on the substrate strip 10A. In some embodiments, the singulation process is performed by cutting the substrate strip 10A along cutting lines between the lens modules 20. The cutting may be performed by mechanical cutting or laser dicing.

Referring to FIG. 5F, after the singulation process, a plurality of singulated structures each including a substrate 10 and one of the first lens modules 20 over the substrate 10 may be formed. As such, the lens module 20 may be formed over the substrate 10 for form the optical device 2C'.

Figure 6A:
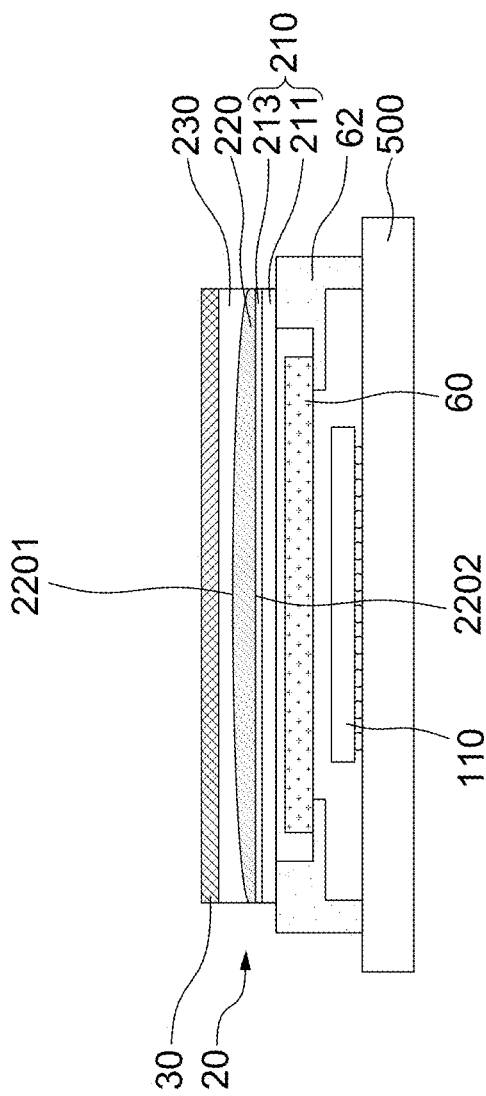
FIGS. 6A to 6D are schematic views of intermediate stages of a method of manufacturing an optical device in accordance with some embodiments of the present disclosure.
Figure 6B:
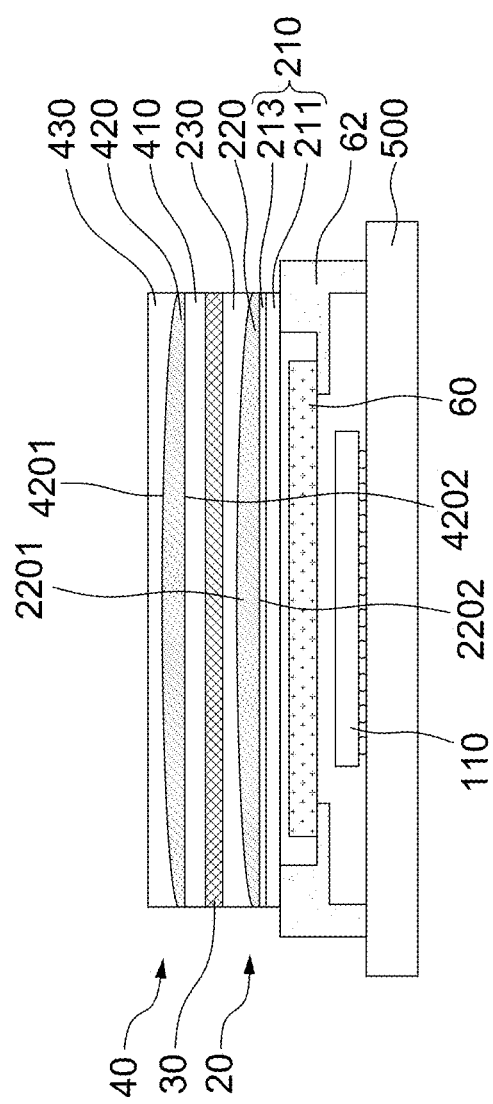

FIGS. 6A to 6B are schematic views of intermediate stages of a method of manufacturing an optical device 3C' in accordance with some embodiments of the present disclosure.

Referring to FIG. 6A, operations similar to those illustrated in FIGS. 5A-5B may be performed to form a structure illustrated in FIG. 5B, and an isolation element 30 may be formed on the electrode 230. In some embodiments, the isolation element 30 is formed by deposition (e.g., CVD) or coating.

Referring to FIG. 6B, a conductive layer (i.e., the electrode 410) may be formed on the isolation element 30, an electro optical layer (i.e., the lens 420) may be formed on the conductive layer (i.e., the electrode 410), and a conductive layer (i.e., the electrode 430) may be formed on the electro optical layer (i.e., the lens 420). In some embodiments, the conductive layers (or the electrodes 410 and 430) and the electro optical layer (i.e., the lens 420) are formed by deposition (e.g., CVD) or coating. As such, a lens module 40 including the electrodes 410 and 430 and the lens 420 is formed on the lens module 20 interposed with the isolation element 30.

Figure 6C:
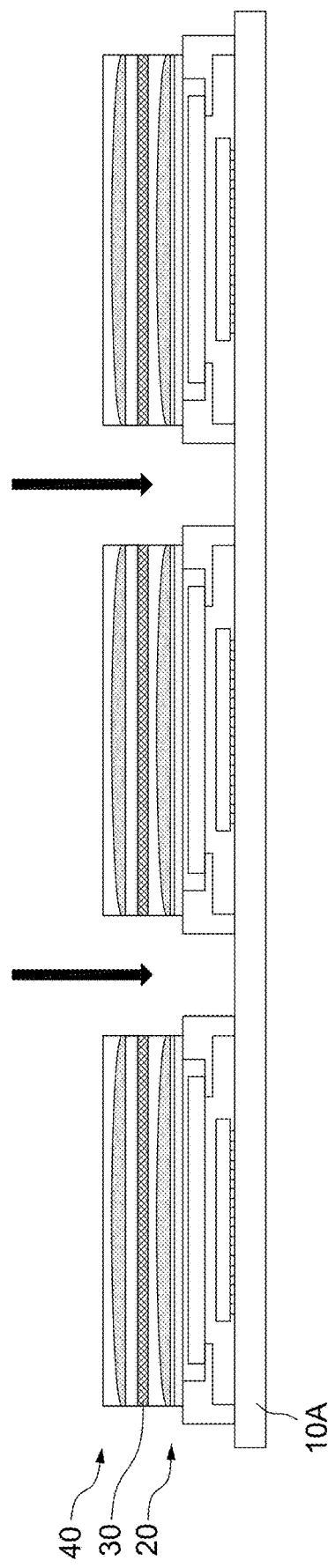

Referring to FIG. 6C, a substrate strip 10A may be provided. In some embodiments, the substrate strip 10A includes a plurality of sensors 110 connected to an upper surface of the substrate strip 10A. In some embodiments, a plurality of supporting frames 62 are attached to the substrate strip 10A, and each of the supporting frames 62 has a cavity in which one of the sensors 110 is accommodated or received. In some embodiments, a plurality of filters 60 are correspondingly disposed within the supporting frames 62.

Still referring to FIG. 6C, a plurality of integrated structures each including the lens modules 20 and 40 may be disposed or formed over the substrate strip 10A, and a singulation process may be performed on the substrate strip 10A. In some embodiments, the singulation process is performed by cutting the substrate strip 10A along cutting lines between the integrated structures. The cutting may be performed by mechanical cutting or laser dicing.

Figure 6D:
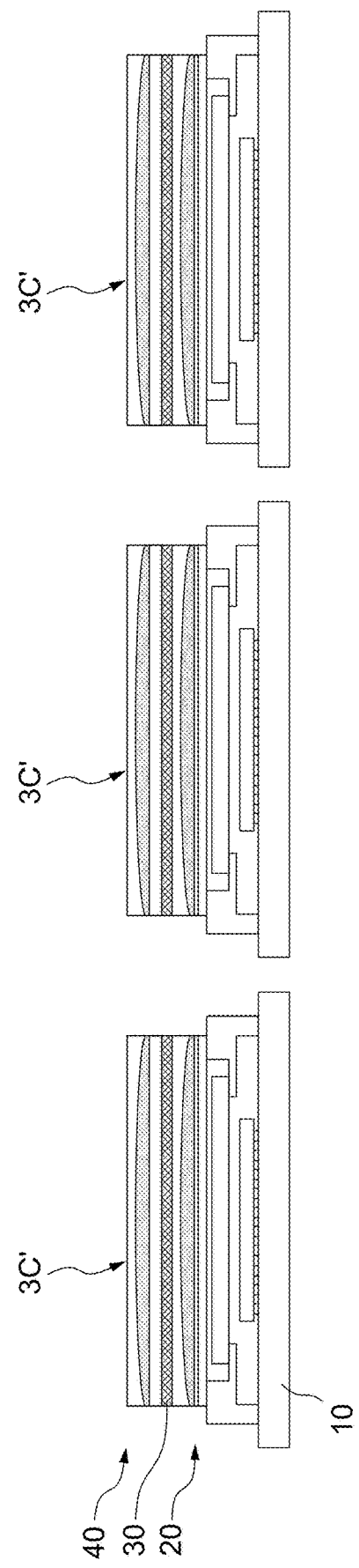

Referring to FIG. 6D, after the singulation process, a plurality of singulated structures each including a substrate 10 and one of the integrated structures each including the lens modules 20 and 40 over the substrate 10 may be formed. As such, the lens modules 20 and 40 may be formed over the substrate 10 for form the optical device 3C'.

Some embodiments of the present disclosure provide an optical device. The optical device includes a substrate, a first electrode, a second electrode, and a first lens. The first electrode and the second electrode are over the substrate and configured to generate a first electric field. The first lens is between the first electrode and the second electrode and has a focal length that varies in response to the first electric field applied to the first lens.

Some embodiments of the present disclosure provide an optical device. The optical device includes a substrate and a first lens module. The substrate includes a sensor. The first lens module is over the sensor. The first lens module includes a first conductive layer, a second conductive layer, and a first lens layer. The first lens layer is between the first conductive layer and the second conductive layer, wherein the first lens layer includes at least an electro optical material.

Some embodiments of the present disclosure provide a method of manufacturing an optical device. The method includes following operations: providing a substrate; and forming a first lens module over the substrate, including: forming a first conductive layer; forming an electro optical layer on the first conductive layer; and forming a second conductive layer on the electro optical layer.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. An optical device, comprising:
    a substrate;
    a first electrode and a second electrode over the substrate and configured to generate a first electric field, wherein a lower surface of the first electrode faces an upper surface of the second electrode; and
    a first lens stacked between the first electrode and the second electrode and having a focal length that varies in response to the first electric field applied to the first lens, wherein the first lens has an upper surface and a lower surface opposite to the upper surface, and the lower surface of the first lens contacts the upper surface of the second electrode.

2. The optical device of claim 1, wherein the first lens has a first portion and a second portion having different thicknesses and directly contacting the first electrode and the second electrode.

3. The optical device of claim 1, wherein the upper surface of the first lens is a curved surface that directly contacts and conforms to the lower surface of the first electrode.

4. The optical device of claim 3, wherein the lower surface of the first lens is a curved surface that conforms to the upper surface of the second electrode.

5. The optical device of claim 1, further comprising:
    a third electrode and a fourth electrode stacked over the first electrode and the second electrode and configured to generate a second electric field; and
    a second lens stacked between and directly contacting the third electrode and the fourth electrode and having a focal length that varies in response to the second electric field applied to the second lens.

6. The optical device of claim 5, further comprising an isolation element isolating the first electric field from the second electric field, wherein the isolation element comprises an insulating material.

7. The optical device of claim 1, further comprising:
    a third electrode over the first electrode and the second electrode; and
    a second lens stacked between the third electrode and the first electrode, wherein the first electrode is between and directly contacting the first lens and the second lens.

8. An optical device, comprising:
    a substrate; and
    a first lens module over the substrate, comprising:
        a first electrode layer and a second electrode layer; and
        a first lens layer stacked between the first electrode layer and the second electrode layer, wherein the first lens layer comprises at least a first electro optical material and is in a form of a deposited layer, and the first lens layer has a focal length that varies in response to an electric field applied to the first lens layer.

9. The optical device of claim 8, further comprising a filter between the substrate and the first lens module.

10. The optical device of claim 9, further comprising a supporting frame attached to the substrate and defining a cavity for accommodating the filter, wherein the first lens module is attached to a top surface of the supporting frame.

11. The optical device of claim 8, wherein the first lens layer has a center portion and a peripheral portion surrounding the center portion, and the center portion and the peripheral portion have different thicknesses.

12. The optical device of claim 8, wherein the first lens layer has a center portion and a peripheral portion surrounding the center portion, and the center portion and the peripheral portion comprise different electro optical materials.

13. The optical device of claim 8, further comprising:
    a second lens module over the first lens module, wherein the second lens module comprises:
        a third electrode layer and a fourth electrode layer; and a second lens layer between the third electrode layer and the fourth electrode layer, wherein the second lens layer comprises at least a second electro optical material; and an isolation element electrically isolating the first lens module from the second lens module.

14. The optical device of claim 8, further comprising:

a third electrode layer electrically coupled to the first lens module; and a second lens layer between the first lens module and the third electrode layer.

15. The optical device of claim 14, wherein the first electrode layer directly contacts the first lens layer and the second lens layer.

16. An optical device, comprising:

a substrate;

a first electrode layer and a second electrode layer over the substrate; and a first lens layer stacked between and contacting the first electrode layer and the second electrode layer and having a first surface convex toward the first electrode layer, wherein the first lens layer has a focal length that varies in response to a first electric field applied to the first lens layer.

17. The optical device of claim 16, wherein the first electrode layer has a concave bottom surface contacting and conformal to the first surface of the first lens layer.

18. The optical device of claim 16, further comprising:

a third electrode layer and a fourth electrode layer over the first lens layer; and a second lens layer between the third electrode layer and the fourth electrode layer and having a focal length that varies in response to a second electric field applied to the second lens layer, wherein the second electric field is different from the first electric field in magnitudes, directions, or a combination thereof.

19. The optical device of claim 16, further comprising:

a third electrode layer over the first lens layer, wherein the first electrode layer is between the second electrode layer and the third electrode layer; and a second lens layer between the third electrode layer and the first electrode layer, wherein the second lens layer has a focal length that varies in response to a second electric field configured to be generated by the first electrode layer and the third electrode layer and applied to the second lens layer.

20. The optical device of claim 19, wherein the first electric field is configured to be generated by the first electrode layer and the second electrode layer, and the first electric field is coupled to the second electric field.

* * * * *